United States Patent
Doyle et al.

(10) Patent No.: US 9,415,458 B2
(45) Date of Patent: Aug. 16, 2016

(54) METHOD TO IMPROVE THE CHARACTERISTICS OF A ROOT PASS PIPE WELD

(75) Inventors: Thomas Edward Doyle, Louisville, OH (US); Clyde David Noel, Houma, LA (US); Terry Louis Breaux, Houma, LA (US); Steven R. Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 2269 days.

(21) Appl. No.: 12/414,712

(22) Filed: Mar. 31, 2009

(65) Prior Publication Data

US 2009/0321402 A1    Dec. 31, 2009

Related U.S. Application Data

(63) Continuation-in-part of application No. 12/163,047, filed on Jun. 27, 2008.

(51) Int. Cl.
   *B23K 9/09*    (2006.01)
   *B23K 9/028*   (2006.01)

(52) U.S. Cl.
   CPC .............. *B23K 9/092* (2013.01); *B23K 9/0282* (2013.01); *B23K 2201/06* (2013.01)

(58) Field of Classification Search
   USPC .......................................... 219/130.1, 130.51
   See application file for complete search history.

(56) References Cited

U.S. PATENT DOCUMENTS

| | | | | |
|---|---|---|---|---|
| 2,566,905 A | * | 9/1951 | Palmer | 99/329 R |
| 3,668,360 A | * | 6/1972 | Ballis | 219/61 |
| 3,789,749 A | * | 2/1974 | Paaskesen | 99/391 |
| 4,258,242 A | * | 3/1981 | Fujimori et al. | 219/61 |
| 4,397,227 A | * | 8/1983 | Landry | 99/334 |
| 4,487,115 A | * | 12/1984 | Su | 99/327 |
| 4,639,576 A | * | 1/1987 | Shoemaker et al. | 219/146.23 |
| 4,972,064 A | | 11/1990 | Stava | |
| 5,030,812 A | | 7/1991 | Sugitani et al. | |
| 5,317,116 A | * | 5/1994 | Tabata et al. | 219/130.51 |
| 5,423,246 A | * | 6/1995 | McNair et al. | 99/334 |
| 5,458,052 A | * | 10/1995 | McNair et al. | 99/385 |
| 5,528,980 A | * | 6/1996 | McClean | 99/389 |
| 5,686,002 A | | 11/1997 | Flood et al. | |
| 5,961,863 A | | 10/1999 | Stava | |

(Continued)

FOREIGN PATENT DOCUMENTS

| | | |
|---|---|---|
| RU | 2169649 C1 | 6/2001 |
| RU | 2225285 C2 | 10/2004 |

(Continued)

*Primary Examiner* — David Angwin
*Assistant Examiner* — Jimmy Chou
(74) *Attorney, Agent, or Firm* — Hahn Loeser & Parks LLP

(57) ABSTRACT

A method and a system for forming a root pass weld for a root pipe joint. A substantially periodic electric welding waveform is generated and a series of electric arc pulses are generated between an advancing welding electrode and a root pipe joint in response to the electric welding waveform. The electric welding waveform includes a base cycle having a background current phase providing a background current level, a peak current phase providing a peak current level, a tail-out current phase providing a decreasing tail-out current level, and at least one heat-increasing current pulse during the background current phase providing a heat-increasing current level being above the background current level.

20 Claims, 9 Drawing Sheets

(56) References Cited

U.S. PATENT DOCUMENTS

| | | | |
|---|---|---|---|
| 6,008,470 A * | 12/1999 | Zhang et al. | 219/137 PS |
| 6,051,810 A * | 4/2000 | Stava | 219/137 PS |
| 6,172,333 B1 * | 1/2001 | Stava | 219/137 PS |
| 6,215,100 B1 | 4/2001 | Stava | |
| 6,232,211 B1 * | 5/2001 | Tsukahara | 438/612 |
| 6,267,044 B1 * | 7/2001 | Friel, Sr. | 99/327 |
| 6,498,321 B1 | 12/2002 | Fulmer et al. | |
| 6,501,049 B2 * | 12/2002 | Stava | 219/137 PS |
| 6,581,512 B1 * | 6/2003 | Mauffrey et al. | 99/389 |
| 6,700,097 B1 * | 3/2004 | Hsu et al. | 219/130.5 |
| 6,708,602 B2 | 3/2004 | Nguyen | 99/389 |
| 6,734,394 B2 * | 5/2004 | Hsu | 219/137 PS |
| 6,794,608 B2 * | 9/2004 | Flood et al. | 219/130.51 |
| 7,036,424 B2 * | 5/2006 | Friel, Sr. | 99/327 |
| 7,105,778 B1 * | 9/2006 | DeLong et al. | 219/386 |
| 7,115,834 B2 * | 10/2006 | Sykes et al. | 219/130.1 |
| 7,132,623 B2 * | 11/2006 | De Miranda et al. | 219/130.51 |
| 7,170,039 B2 * | 1/2007 | Lee et al. | 219/680 |
| 7,472,644 B2 * | 1/2009 | Friel, Sr. | 99/327 |
| 7,479,295 B2 * | 1/2009 | Nguyen | 426/468 |
| D622,091 S * | 8/2010 | Knox et al. | D7/330 |
| 2003/0071026 A1* | 4/2003 | Hsu | 219/137 PS |
| 2006/0231540 A1* | 10/2006 | Stava | 219/137 PS |
| 2007/0235434 A1* | 10/2007 | Davidson et al. | 219/130.51 |
| 2007/0241087 A1* | 10/2007 | Peters | 219/137 PS |
| 2008/0006612 A1 | 1/2008 | Peters et al. | |
| 2008/0053978 A1* | 3/2008 | Peters et al. | 219/130.5 |
| 2008/0149610 A1* | 6/2008 | Huismann et al. | 219/137 R |

FOREIGN PATENT DOCUMENTS

| | | |
|---|---|---|
| SU | 1599165 A1 | 10/1990 |
| WO | 2007/028858 A1 | 3/2007 |

* cited by examiner

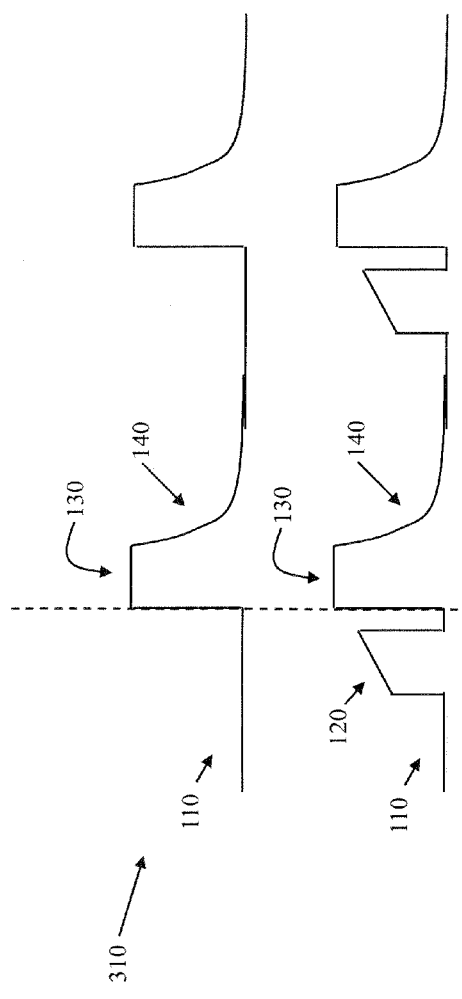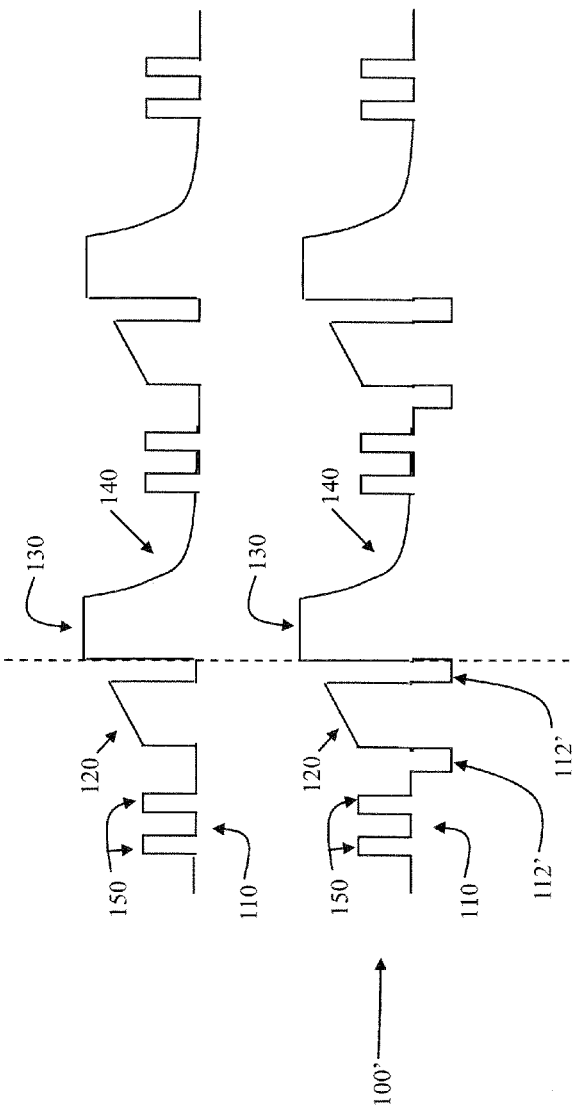

METHOD TO IMPROVE THE CHARACTERISTICS OF A ROOT PASS PIPE WELD

CROSS-REFERENCE TO RELATED APPLICATIONS/INCORPORATION BY REFERENCE

This U.S. Patent Application is a continuation-in-part (CIP) of U.S. patent application Ser. No. 12/163,047 filed on Jun. 27, 2008 which is incorporated herein by reference in its entirety.

U.S. Pat. No. 4,972,064, issued on Nov. 20, 1990, is incorporated herein by reference in its entirety. U.S. Pat. No. 6,051,810, issued on Apr. 18, 2000, is incorporated herein by reference in its entirety. U.S. Pat. No. 6,498,321, issued on Dec. 24, 2002, is incorporated herein by reference in its entirety. U.S. patent application Ser. No. 11/861,379 filed on Sep. 26, 2007 is incorporated herein by reference in its entirety.

TECHNICAL FIELD

Certain embodiments relate to electric arc welding. More particularly, certain embodiments relate to a method of increasing heat input to a weld during a gas metal arc welding (GMAW) short-circuit arc process.

BACKGROUND

Open root welding is used for pipe and single-sided plate welding in situations that preclude welding from both sides of the material. This type of welding is common in the petrochemical and process piping industries. For many years, pipe fabricators have been searching for a faster, easier method to make single-sided open root welds. It is difficult, even for skilled welders, to weld open root pipe. Inflexible positioning makes pipeline welding more difficult, time consuming, and expensive. Higher strength pipe steels are driving a requirement to achieve a low hydrogen weld metal deposit. Gas tungsten arc welding (GTAW) has been an available process capable of achieving the quality requirements, however, GTAW root welds are expensive to make. The gas metal arc welding (GMAW) process has been avoided because of problems with sidewall fusion and lack of penetration.

Conventional constant voltage (CV) GMAW welding processes produce a flat internal bead, or "suck back" where the bead shrinks back into the root due to high weld puddle temperatures. GTAW welding produces good pipe welds, however, travel speeds may be slow and heat input may be high. Stick welding with cellulose electrodes provides good fusion characteristics but leaves deep wagon tracks (requiring more labor for grinding), a very convex root weld, and a high hydrogen deposit.

The Surface Tension Transfer (STT) process has been developed to make single-sided root welds on pipe, for example. STT is a controlled short-circuit transfer GMAW process that produces a low hydrogen weld deposit and makes it easier to achieve a high quality root weld in all positions. STT eliminates the lack of penetration and poor sidewall fusion problems encountered when using the traditional short-arc GMAW process.

The STT process produces a low hydrogen weld metal deposit in open root joints with easier operation, better back beads, better sidewall fusion, and less spatter and fumes than other processes. Furthermore, in closed root welding, greater heat input may be required to achieve adequate penetration. STT differs from the traditional GMAW short-arc welding process in that the arc current is precisely controlled independently from the wire feed speed. Also, the arc current is carefully regulated to reduce puddle agitation and to eliminate violent "explosions" that occur during the traditional short-arc GMAW process.

Even though the current STT process is significantly better than the traditional short-arc GMAW process, especially for root welding applications, the ability to better control heat input into the weld to achieve even better penetration without increasing the weld puddle fluidity is desired, along with the ability to lower weld hardness and heat affected zone (HAZ) hardness, increase welding travel speeds, and reduce the amount of pre-heating.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY

Embodiments of the present invention comprise a method and a system for forming a root pass weld for a root pipe joint. A substantially periodic electric welding waveform is generated and a series of electric arc pulses are generated between an advancing welding electrode and a root pipe joint in response to the electric welding waveform. The electric welding waveform includes a base cycle having a background current phase providing a background current level, a peak current phase providing a peak current level, a tail-out current phase providing a decreasing tail-out current level, and at least one heat-increasing current pulse during the background current phase providing a heat-increasing current level being above the background current level. Both open root welding and closed root welding may be improved using the system and method described herein.

These and other features of the claimed invention, as well as details of illustrated embodiments thereof, will be more fully understood from the following description and drawings.

BRIEF DESCRIPTION OF THE DRAWINGS

FIGS. 3A-3D illustrate exemplary embodiments of portions of a modulating waveform as generated by the various capabilities of the system of FIG. 2;

DETAILED DESCRIPTION

Figure 1:
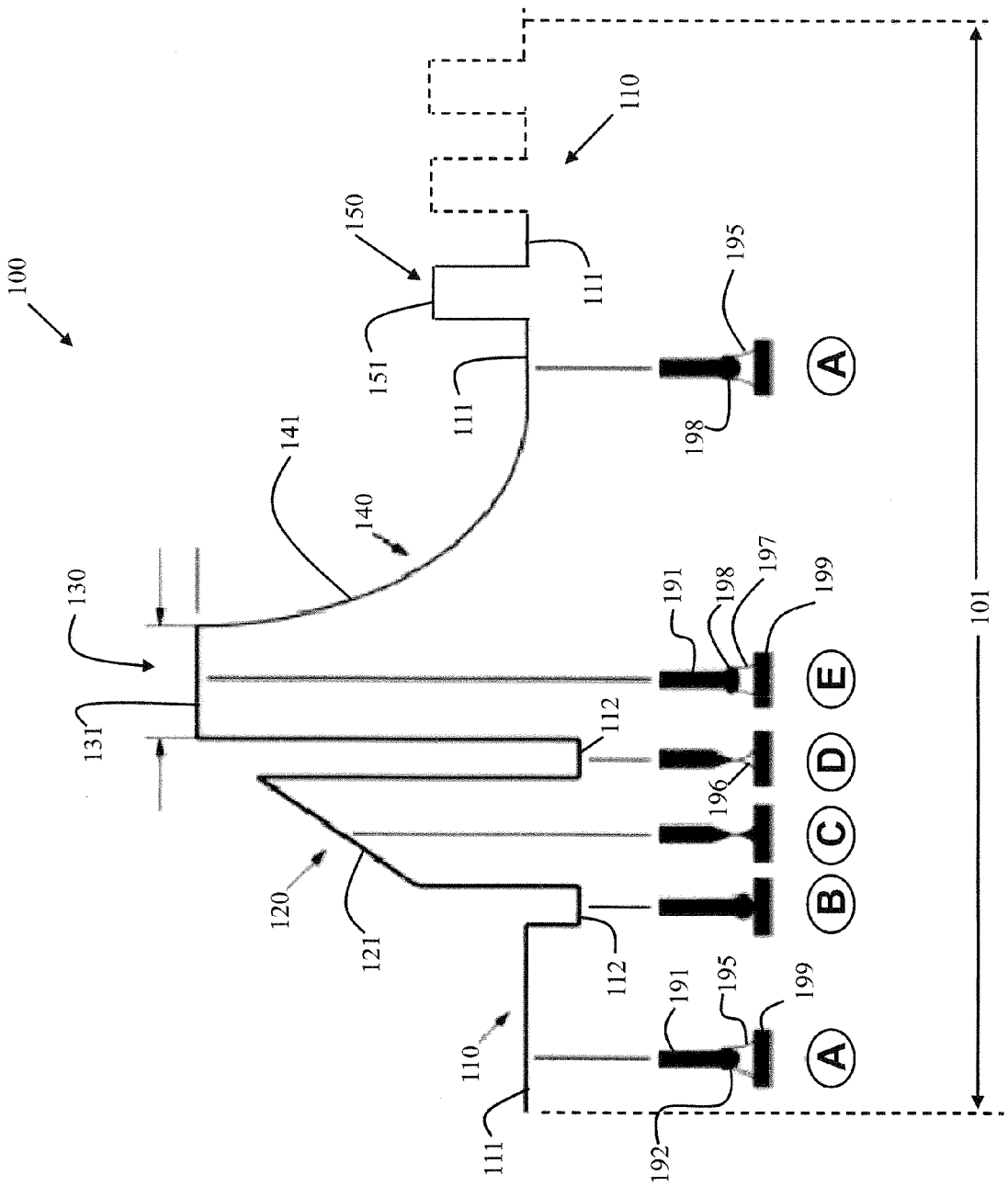
FIG. 1A illustrates an exemplary embodiment of a cycle of an electric welding waveform used in an arc welding process to increase heat input to a weld.
FIG. 1B illustrates the various stages of the arc welding process over the cycle of FIG. 1A using the electric welding waveform of FIG. 1A, showing the relationship between a welding electrode and a metal workpiece.

FIG. 1A illustrates an exemplary embodiment of a cycle 101 of an electric welding waveform 100 used in an arc welding process to increase heat input to a weld. FIG. 1B illustrates the various stages (A-E) of the arc welding process over the cycle 101 using the electric welding waveform of FIG. 1A, showing the relationship between a welding electrode 191 and a metal workpiece 199. During an arc welding process, a series of electric arc pulses are generated between the advancing electrode 191 and the metal workpiece 199 using an electric arc welding system capable of generating the electric welding waveform 100 to produce the electric arc pulses. In general, the cycle 101 periodically repeats during the arc welding process to produce the resultant weld. However, the cycle 101 may repeat without the same number of heat increasing pulses 150 and possibly without a pinch current phase 120 if a short condition does not occur.

The cycle 101 of the electric welding waveform 100 includes a background current phase 110 providing a background current level 111, a pinch current phase 120 providing a monotonically increasing pinch current level 121, a peak current phase 130 providing a peak current level 131, and a tail-out current phase 140 providing a monotonically decreasing tail-out current level 141.

During the background current phase 110, an electric arc 195 is sustained between the electrode 191 and the workpiece 199 producing a molten metal ball 192 on a distal end of the electrode 191 (see stage A in FIG. 1B). At stage B, the molten metal ball 192, still connected to the electrode 191, shorts to the workpiece 199. When the short occurs, the arc 195 is extinguished and the current level of the waveform 100 is dropped below the background current level 111 to a current level 112, allowing the molten ball 192 to wet into a puddle on the workpiece 199.

During the pinch current phase 120, the current level of the waveform 100 is increased monotonically (e.g., ramped upward) above the background current level 111, providing the increasing pinch current level 121 which causes the shorted molten metal ball 192 to begin to pinch off from the distal end of the electrode 191 into the puddle of the workpiece 199 as shown in stage C of FIG. 1B. As the molten metal ball 192 is about to pinch off from the electrode 191, the current level of the waveform 100 is again dropped below the background current level 111 to a current level 112 to avoid spatter, and an arc 196 is re-established between the electrode 191 and the workpiece 199.

Once the arc 196 is re-established, the waveform 100 enters the peak current phase 130. During the peak current phase 130, the current level of the waveform 100 is increased to and held at the peak current level 131. In accordance with an embodiment, the peak current level 131 is the highest current level of the waveform 100 and establishes an arc 197 between the electrode 191 and the workpiece 199 of sufficient strength to begin forming a next molten metal ball 198 at the distal end of the electrode 191.

After the peak current phase 130, the waveform 100 enters the tail-out current phase 140. During the tail-out current phase 140, the current level of the waveform 100 monotonically (e.g., exponentially) decreases toward the background current level 111 providing the decreasing tail-out current level 141. The current of the waveform 100 inputs heat into the weld. The tail-out current phase 140 acts as a coarse heat control phase for the waveform 100 whereas the background current phase 110 acts as a fine heat control phase for the waveform 100. However, in certain arc welding applications, it may be desirable to provide additional heat input control.

After the tail-out current phase 140, the background current phase 110 is again entered, providing the background current level 111 and producing a substantially uniform next molten metal ball 198 at the distal end of the electrode 191 (stage A). During the background current phase 110, at least one heat-increasing current pulse 150 is generated, providing an intermediate current level 151 that is between the background current level 111 and the peak current level 131. The heat increasing current pulse 150 may be periodically repeated within the background current phase 110 until a next short between the molten metal ball 198 and the workpiece 199 occurs, at which time the arc 195 is extinguished and the current level of the waveform 100 is dropped below the background current level 111 to a current level 112, allowing the next molten ball 198 to wet into the puddle on the workpiece 199 (stage B).

The heat-increasing current pulses 150 serve to re-heat the puddle and surrounding area to increase penetration. Such an increase in heat provided by the heat-increasing current pulses 150 may be desired in, for example, the welding of an open root joint in order to provide better penetration without increasing the fluidity of the puddle. The heat increasing pulses are not so large in amplitude as to transfer droplets across the arc and are not so wide in pulsewidth as to force the welding system above the short arc transition into globular transfer. Again, in general, the cycle 101 periodically repeats during the arc welding process to produce the resultant weld. However, the cycle 101 may repeat without the same number of heat increasing pulses 151 and possibly without the pinch current phase 120 if a short does not occur. As used herein, the term "current level" refers to a current amplitude which is substantially steady but may have some variations due to the somewhat in-exact nature of producing an electric welding waveform.

As an example, in accordance with an embodiment of the present invention, the arc welding process is a gas metal arc welding (GMAW) process using argon and carbon dioxide as shielding gases. The background current level 111 is about 70 amps, the peak current level 131 is about 330 amps, and the intermediate current level 151 is about 210 amps. The pulsewidth of a single heat-increasing pulse 150 is about 1 millisecond and may be repeated about every 3 milliseconds, up to three to six pulses during the background current phase 110. The period of the cycle 101 is about 15 milliseconds.

Figure 2:
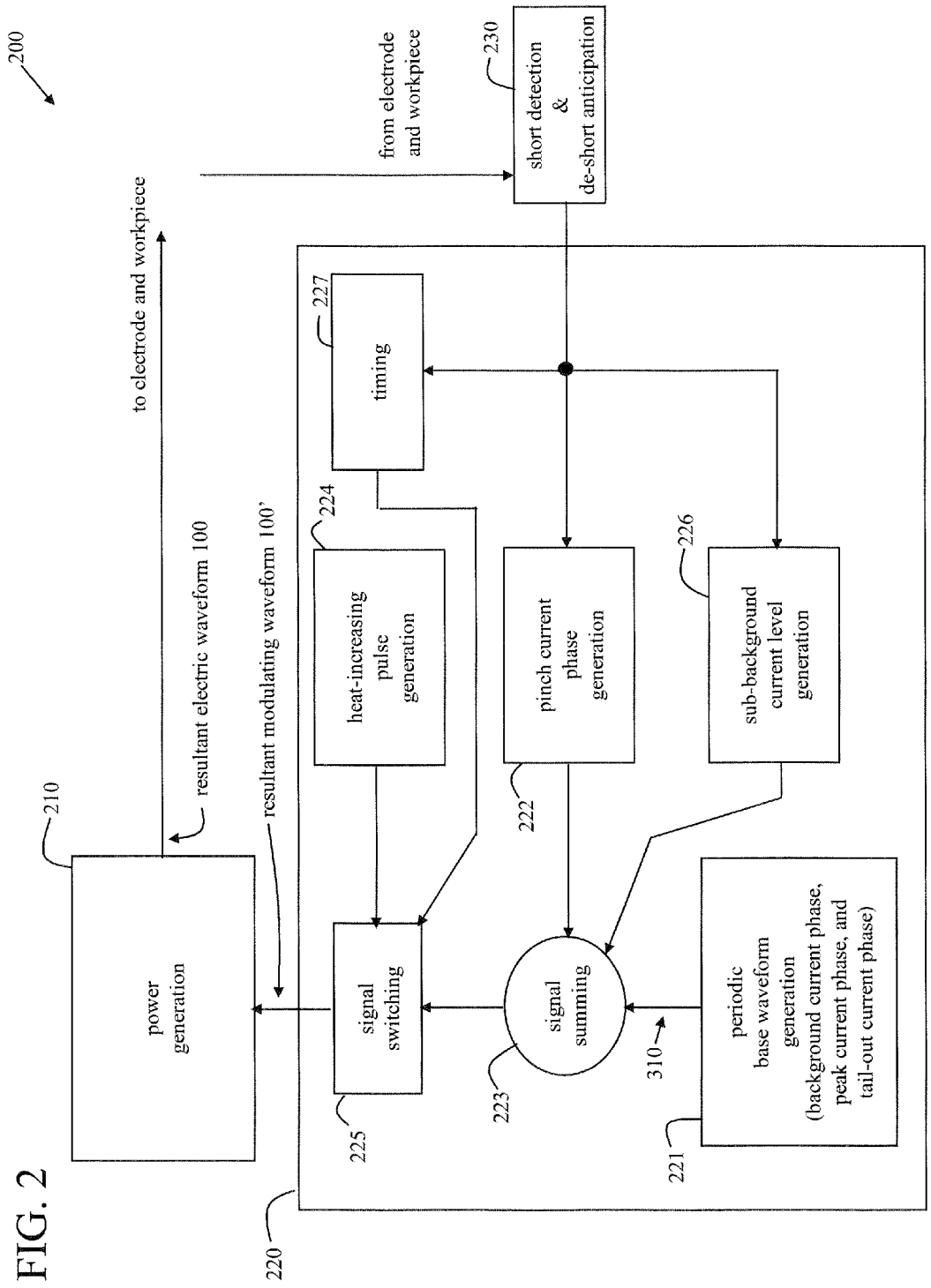
FIG. 2 illustrates a functional block diagram of a first exemplary embodiment of a system for generating the electric welding waveform of FIG. 1.

FIG. 2 illustrates a functional block diagram of a first exemplary embodiment of a system 200 for generating the electric welding waveform 100 of FIG. 1. The system 200 provides power generation capability 210 and modulating waveform generation and shaping capability 220 to create a modulating waveform 100'. The system 200 also provides short detection and premonition detection (de-short anticipation) capability 230 to detect when a short condition occurs between the electrode 191 and the workpiece 199 and to anticipate when a short condition is about to terminate (de-short condition) as a molten metal ball (e.g., 192) pinches off into the puddle on the workpiece 199.

A modulating waveform 100' generated by the modulating waveform generation and shaping capability 220 is used to modulate the power generation capability 210 which provides electric current to the electrode 191 and workpiece 199 in the form of the electric welding waveform 100. The modulating waveform generation and shaping capability 220 includes a periodic base waveform generation capability 221. FIGS. 3A-3D illustrate exemplary embodiments of portions of the modulating waveform 100' as generated by the various capabilities of the system 200 of FIG. 2. FIG. 3A illustrates a periodic base waveform portion 310 generated by the periodic base waveform generation capability 221. The periodic base waveform generation capability 221 provides the generation of the background current phase 110, peak current phase 130, and tail-out current phase 140 of the modulating waveform 100' in a periodic manner.

The modulating waveform generation and shaping capability 220 also includes a pinch current phase generation capability 222. FIG. 3B illustrates the periodic base waveform portion 310 of FIG. 3A having the pinch current phase 120 added. In accordance with an embodiment of the present invention, the pinch current phase 120 may be summed with the periodic base waveform portion 310 using a signal summing capability 223 of the modulating waveform generation and shaping capability 220.

The modulating waveform generation and shaping capability 220 further includes a heat-increasing pulse generation capability 224. FIG. 3C illustrates the periodic base waveform portion 310 of FIG. 3A having the pinch current phase 120 of FIG. 3B and having the heat-increasing pulses 150 switched in during the background current phase 110. In accordance with an embodiment of the present invention, the heat-increasing current pulses 150 may be switched in during the background current phase 110 using a signal switching capability 225 of the modulating waveform generation and shaping capability 220.

The modulating waveform generation and shaping capability 220 also includes a sub-background current level generation (current reducing) capability 226. FIG. 3D illustrates the periodic base waveform portion 310 of FIG. 3A having the pinch current phase 120 of FIG. 3B, the background current phase 110 having the heat-increasing current pulses 150 as shown in FIG. 3C, and having the sub-background current portions 112' added. In accordance with an embodiment of the present invention, the sub-background current portions 112' may be summed with the periodic base waveform portion 310 and the pinch current phase 120 using the signal summing capability 223 of the waveform generation and shaping capability 220.

The resultant modulating waveform 100' of FIG. 3D is used to modulate the power generation capability 210 to provide the actual current levels (111, 112, 121, 131, 141, 151) of the various portions of the electric welding waveform 100 to the electrode 191 and the workpiece 199 as shown in FIG. 1 and FIG. 2.

During a welding process using the system 200, the short detection and de-short anticipation capability 230 monitors current and voltage at the electrode 191 and the workpiece 199 and detects when a short condition occurs between the electrode 191 and the workpiece 199 and also anticipates when the short condition is about to terminate (de-short condition). When a short condition occurs, the sub-background current level capability 226 immediately pulls the current level of the waveform 100 below the background current level 110 to a current level 112, in response to the short condition being detected, allowing a molten metal ball to wet into a puddle on the workpiece 199 as described previously herein. Then the pinch current phase generation capability 222 applies the monotonically increasing pinch current level 121 to the waveform 100.

When a de-short condition is anticipated (i.e., the molten metal ball is about to pinch off from the distal end of the electrode), the sub-background current level capability 226 again pulls the current level of the waveform 100 below the background current level 110 to the current level 112, in response to the de-short condition being anticipated, in order to avoid splatter. Furthermore, a timing capability 227 of the waveform generation and shaping capability 220 is triggered. The timing capability 227 counts down over the time segments occupied by the peak current phase 130 and the tail-out current phase 140 until the waveform 100 reaches the background current phase 110.

In accordance with an embodiment of the present invention, the timing capability is pre-programmed with the amount of time occurring between the de-short condition and entrance into the background current phase 110. Once the timing capability 227 finishes counting down, indicating that the background current phase 110 has been entered, the signal switching capability 225 is triggered to switch in the heat-increasing pulses 150 from the heat-increasing pulse generation capability 224. The heat-increasing pulses 150 are switched into the waveform 100 during the background current phase 110 until a next short condition is detected.

The various functional capabilities of the system 200 of FIG. 2 may be implemented using configurations of electronic components which may include analog and/or digital electronic components. Such configurations of electronic components may include, for example, pulse generators, timers, counters, rectifiers, transistors, inverters, oscillators, switches, transformers, wave shapers, amplifiers, state machines, digital signal processors, microprocessors, and microcontrollers. Portions of such configurations may be programmable in order to provide flexibility in implementation. Various examples of such configurations of electronic components may be found in U.S. Pat. No. 4,972,064, U.S. Pat. No. 6,051,810, U.S. Pat. No. 6,498,321, and U.S. patent application Ser. No. 11/861,379, each of which is incorporated herein by reference in its entirety.

In accordance with an embodiment of the present invention, the system 200 includes a first configuration of electronic components to generate the background current phase 110, the peak current phase 130, and the tail-out current phase 140 of the electric welding waveform 100. The system 200 further includes a second configuration of electronic components to generate the pinch current phase 120 of the electric welding waveform 100. The system 200 also includes a third configuration of electronic components to generate at least one heat-increasing current pulse 150 of the electric welding waveform 100 during the background current phase 110.

In accordance with an embodiment of the present invention, the system 200 also includes a fourth configuration of electronic components to decrease the current level of the electric welding waveform 100 below the background current level at an end of the background current phase 110 in response to the electrode shorting to the workpiece. The system 200 further includes a fifth configuration of electronic components to decrease the current level of the electric welding waveform 100 below the background current level at an end of the pinch current phase 120 in anticipation of the electrode de-shorting from the workpiece.

The first through fifth configurations of electronic components may not necessarily be independent of each other but may share certain electronic components. For example, in accordance with an embodiment of the present invention, many of the electronic components of the first configuration may be the same as many of the electronic components of the third configuration. Similarly, many of the electronic components of the fourth configuration may be the same as many of the electronic components of the fifth configuration. Other shared components may be possible as well, in accordance with various embodiments of the present invention.

The functional implementation shown in FIG. 2 illustrates one exemplary embodiment. Other embodiments are possible as well. For example, in accordance with another embodiment, the pinch current phase 120 may be switched into the modulating waveform 100' via signal switching capability 225, instead of being summed in via signal summing capability 223. Similarly, the heat-increasing pulses 150 may be summed into the modulating waveform 100' via signal summing capability 223, instead of being switched in via signal switching capability 225. In accordance with another embodiment, the sub-background current level generation capability 226 may not be present, or may be optional, allowing generation of a modulating waveform that does not include the current level portions 112'. Other modified embodiments are possible as well, which result in generating the electric welding waveform 100 of FIG. 1 or similar waveforms having at least one heat-increasing current pulse during a background current phase.

Figure 4:
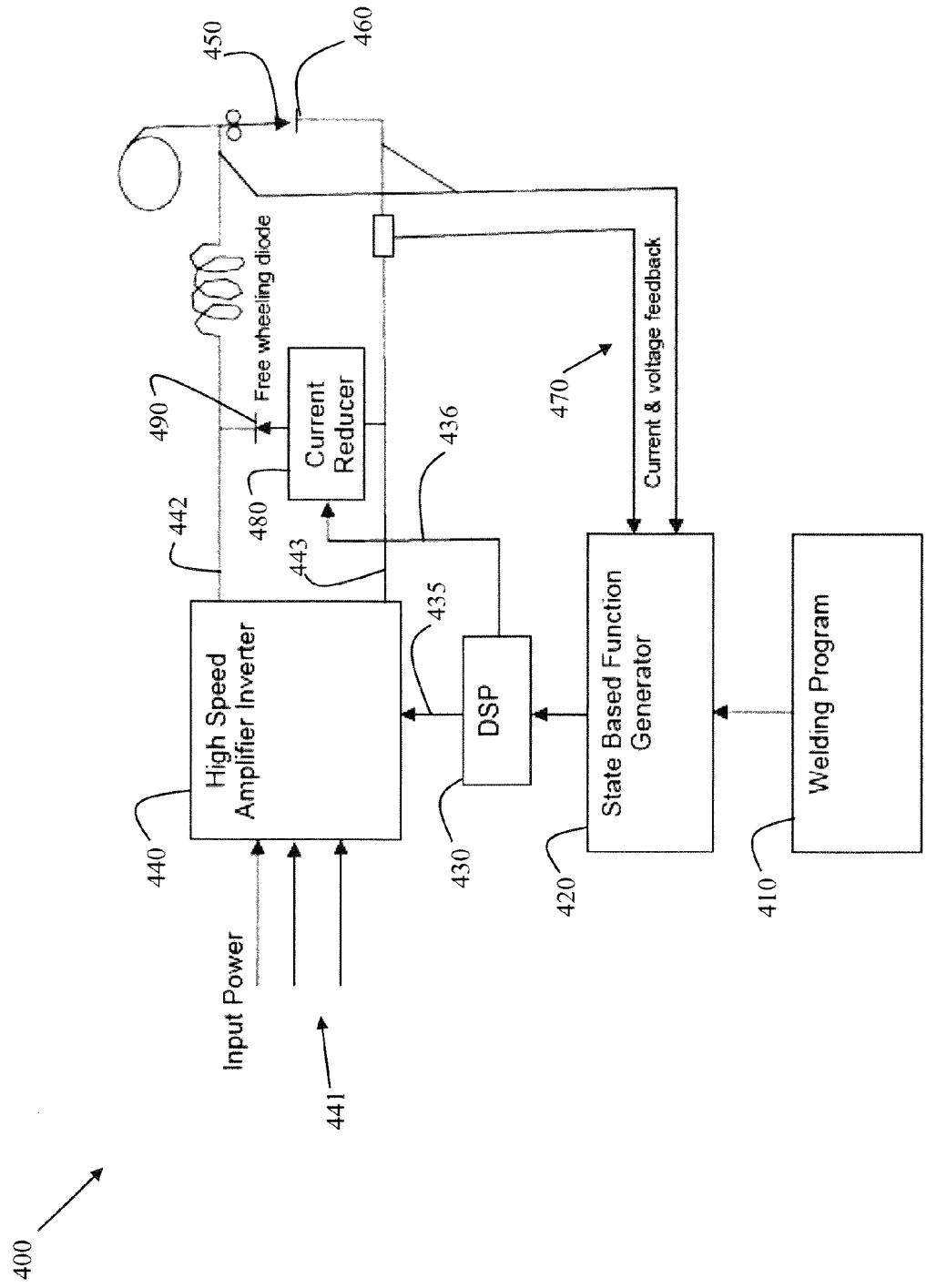
FIG. 4 illustrates a functional block diagram of a second exemplary embodiment of a system for generating the electric welding waveform of FIG. 1.

FIG. 4 illustrates a functional block diagram of a second exemplary embodiment of a system 400 for generating the electric welding waveform 100 of FIG. 1. The system 400 is a state machine type of system as is described herein. The Lincoln Electric Power Wave™ 450 system is an example of a state machine type of welding system.

The system 400 includes a welding program 410 loaded onto a state based function generator 420. In accordance with an embodiment of the present invention, the state based function generator 420 includes a programmable microprocessor device. The welding program 410 includes the software instructions for generating an electric welding waveform. The system further includes a digital signal processor (DSP) 430 operationally interfacing to the state based function generator 420. The system also includes a high speed amplifier inverter 440 operationally interfacing to the DSP 430.

The DSP 430 takes its instructions from the state based function generator 420 and controls the high speed amplifier inverter 440. The high speed amplifier inverter 440 transforms a high voltage input power 441 into a low voltage welding output power in accordance with control signals 435 from the DSP 430. For example, in accordance with an embodiment of the present invention, the DSP 430 provides control signals 435 which determine a firing angle (timing of switch activation) for the high speed amplifier inverter 440 to produce various phases of an electric welding waveform.

The outputs 442 and 443 of the high speed amplifier inverter 440 are operationally connected to a welding electrode 450 and a workpiece 460 respectively to provide a welding current which forms an electric arc between the electrode 450 and the workpiece 460. The system 400 also includes voltage and current feedback capability 470 which senses a voltage between the electrode 450 and the workpiece 460 and which senses current flowing through the welding circuit formed by the electrode 450, the workpiece 460, and high speed amplifier inverter 440. The sensed current and voltage are used by the state based function generator 420 to detect shorting of the electrode 450 to the workpiece 460 (i.e., a short condition) and to detect when a molten metal ball is about to pinch off from the electrode 450 (i.e., a de-short condition).

The system 400 further includes a current reducer 480 and a diode 490. The current reducer 480 and the diode 490 are operationally connected between the outputs 442 and 443 of the high speed amplifier inverter 440. The current reducer 480 also operationally interfaces to the DSP 430. When a short condition occurs between the electrode 450 and the workpiece 460, the DSP 430 commands the current reducer 480, via a control signal 436, to pull the current level through the welding circuit below a predefined background current level. Similarly, when a de-short condition occurs (i.e., a molten metal ball pinches off from the distal end of the electrode 450) the DSP 430 commands the current reducer 480 to pull the current level through the welding circuit below a predefined background current level. In accordance with an embodiment of the present invention, the current reducer 480 includes a Darlington switch, a resistor, and a snubber.

Figure 5:
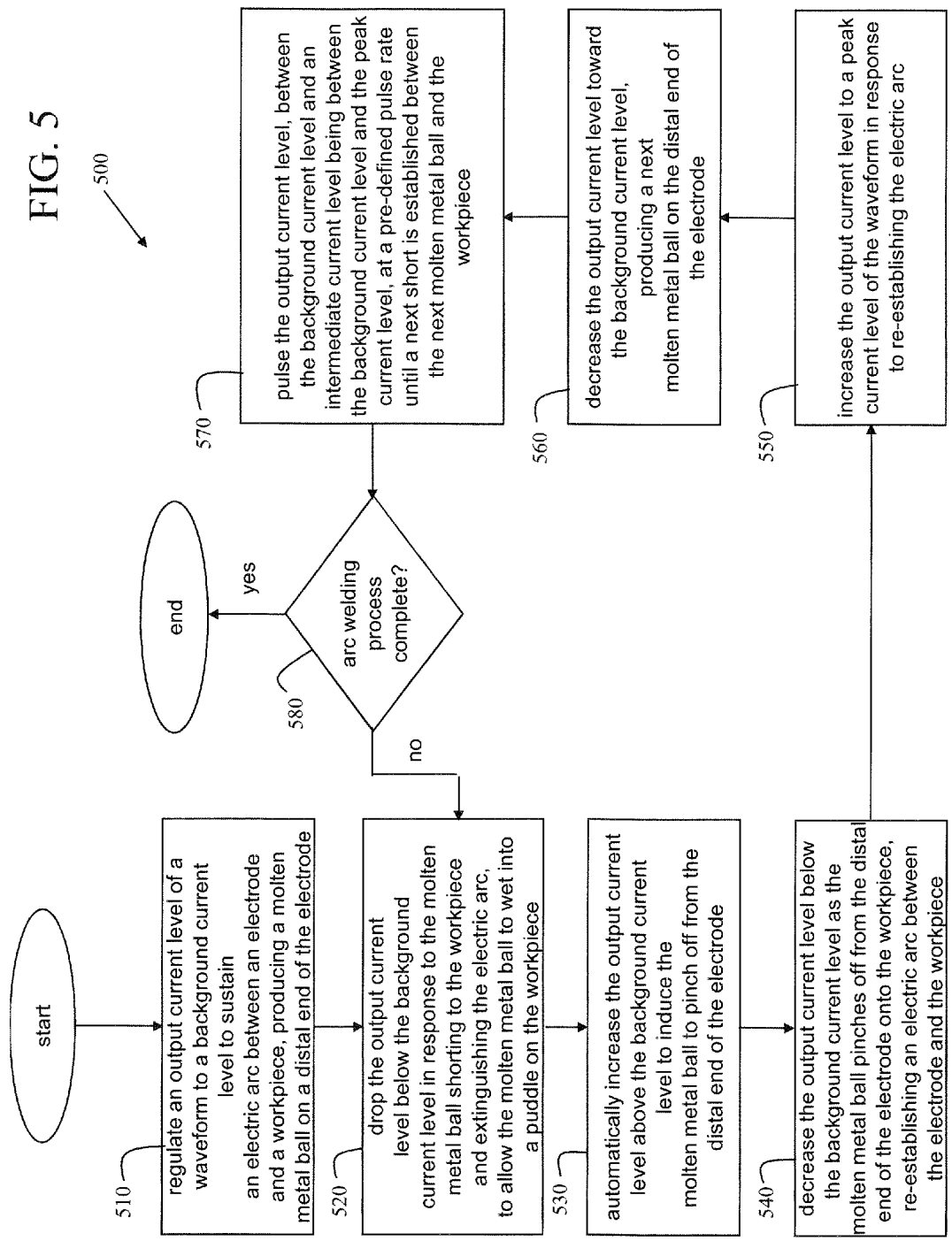
FIG. 5 illustrates a flowchart of a first exemplary embodiment of a method of increasing heat input to a weld during an arc welding process using the electric welding waveform of FIG. 1 and the system of FIG. 2 or the system of FIG. 4.

FIG. 5 illustrates a flowchart of a first exemplary embodiment of a method 500 of increasing heat input to a weld during an arc welding process using the electric welding waveform 100 of FIG. 1 and the system 200 of FIG. 2 or the system 400 of FIG. 4. In step 510, regulate an output current level of the waveform 100 to a background current level 111 to sustain an electric arc 195 between an electrode (e.g., 191 or 450) and a workpiece (e.g., 199 or 460), producing a molten metal ball 192 on a distal end of the electrode (e.g., 191 or 450). In step 520, drop the output current level below the background current level 111 in response to the molten metal ball 192 shorting to the workpiece (e.g., 199 or 460) and extinguishing the electric arc 195, to allow the molten metal ball 192 to wet into a puddle on the workpiece (e.g., 199 or 460). In step 530, automatically increase the output current level above the background current level 111 to induce the molten metal ball 192 to pinch off from the distal end of the electrode (e.g., 191 or 450).

In step 540, decrease the output current level below the background current level 111 as the molten metal ball 192 pinches off from the distal end of the electrode (e.g., 191 or 450) onto the workpiece (e.g., 199 or 460), re-establishing an electric arc 196 between the electrode (e.g., 191 or 450) and the workpiece (e.g., 199 or 460). In step 550, increase the output current level to a peak current level 131 of the waveform 100 in response to re-establishing an electric arc 196. In step 560, decrease the output current level toward the background current level 111, producing a next molten metal ball 198 on the distal end of the electrode (e.g., 191 or 450). In step 570, pulse the output current level, between the background current level 111 and an intermediate current level 151 being between the background current level 111 and the peak current level 131, at a pre-defined pulse rate until a next short is established between the next molten metal ball 198 and the workpiece (e.g., 199 or 460). In step 580, if the arc welding process is not completed, then proceed back to step 520, otherwise, end.

Figures 6A, 6B:
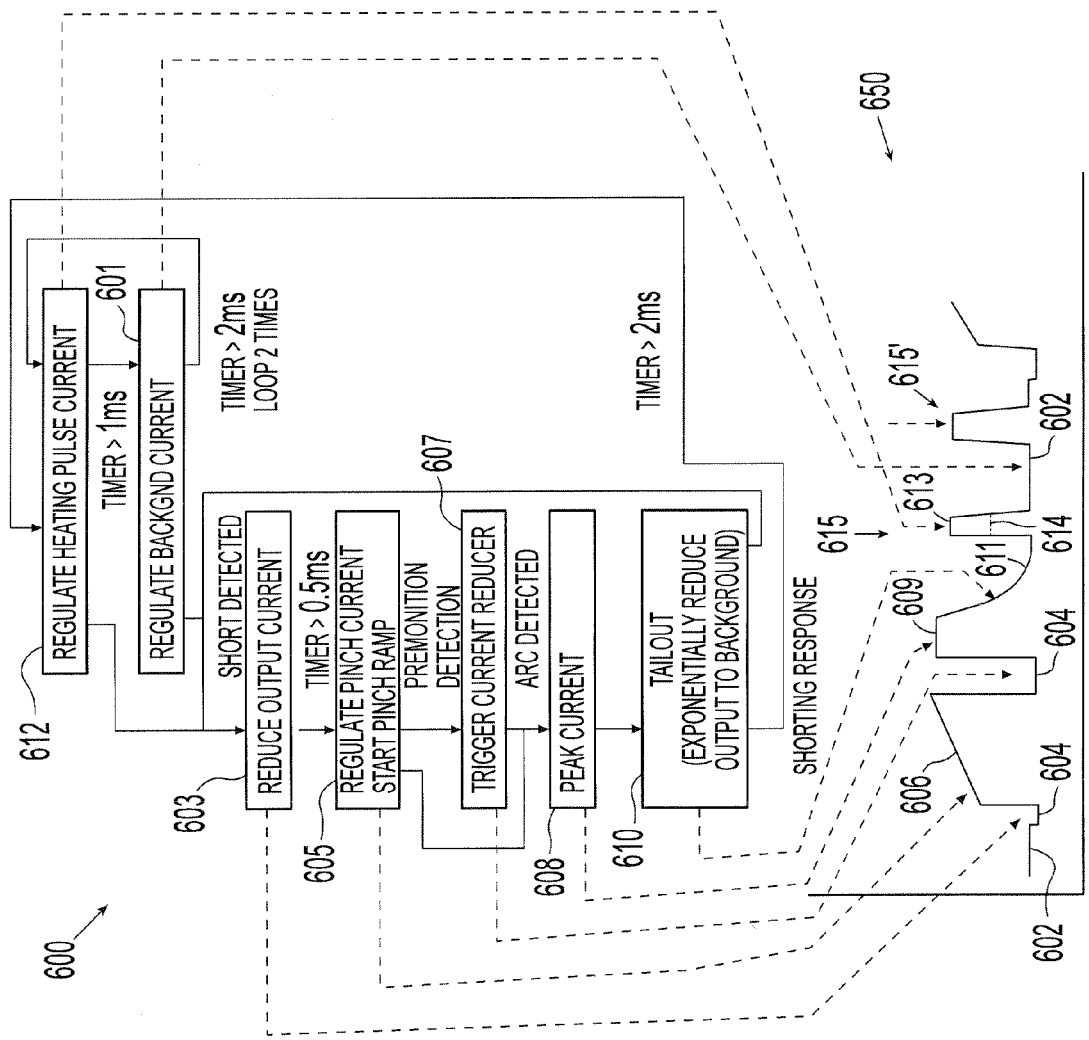
FIGS. 6A-6B illustrate a flowchart and resulting electric welding waveform of a second exemplary embodiment of a method of increasing heat input to a weld during an arc welding process using the system of FIG. 4.

FIGS. 6A-6B illustrate a flowchart and resulting electric welding waveform 650 of a second exemplary embodiment of a method 600 of increasing heat input to a weld during an arc welding process using the system 400 of FIG. 4. In step 601, regulate an output current level of an electric welding waveform 650 to a background current level 602. When a short condition is detected, then in step 603, reduce the output current level to a sub-level 604 being below the background current level 602 by triggering the current reducer 480. In step 605, start ramping the output current level according to a pinch current ramp 606. When a de-short condition (pinch off) is detected, then in step 607, reduce the output current level again to a sub-level 604 by triggering the current reducer 480.

In step 608, regulate the output current level to a peak current level 609 in response to re-establishing an arc between the electrode 450 and the workpiece 460. In step 610, decrease the output current level from the peak current level 609 toward the background current level 602 according to a monotonically decreasing tail-out current ramp 611. In step 612, regulate the output current level to a heat increasing current level 613 during a first pulse interval 614 forming a heat increasing current pulse 615.

The method 600 may alternate between step 601 and step 612 (i.e., the output current may switch back and forth between the heat increasing current level 613 and the background current level 602 forming subsequent heat increasing current pulses) for a pre-determined number of times, or until a next short condition is detected. Furthermore, in accordance with an embodiment of the present invention, the pulse width and amplitude of successive heat increasing current pulses 615' may be the same as or different from the pulse width and amplitude of the first heat increasing current pulse 615, depending on the specifics of the welding operation (e.g., weld metals, shielding gases, etc.).

Figure 7:
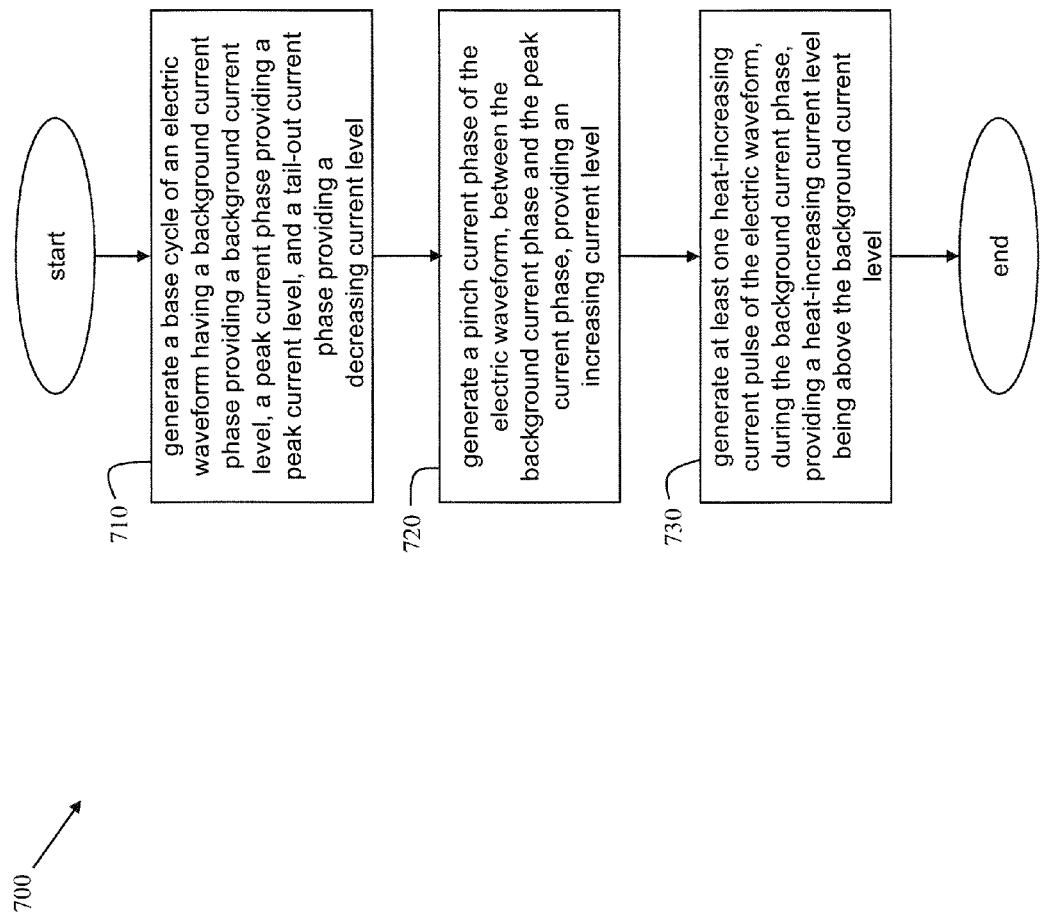
FIG. 7 illustrates a flowchart of a third exemplary embodiment of a method of increasing heat input to a weld during an arc welding process using the electric welding waveform of FIG. 1 or the electric welding waveform of FIG. 6B and the system of FIG. 2 or the system of FIG. 4.

FIG. 7 illustrates a flowchart of a third exemplary embodiment of a method 700 of increasing heat input to a weld during an arc welding process using the electric welding waveform 100 of FIG. 1 or the electric welding waveform 650 of FIG. 6B and the system 200 of FIG. 2 or the system 400 of FIG. 4. In step 710, generate a base cycle (e.g., 310) of an electric welding waveform (e.g., 100) having a background current phase (e.g., 110) providing a background current level (e.g., 111), a peak current phase (e.g., 130) providing a peak current level (e.g., 131), and a tail-out current phase (e.g., 140) providing a decreasing tail-out current level (e.g., 141). In step 720, generate a pinch current phase (e.g., 120) of the electric welding waveform (e.g., 100), between the background current phase (e.g., 110) and the peak current phase (e.g., 130), providing an increasing pinch current level (e.g., 121). In step 730, generate at least one heat-increasing current pulse (e.g., 150) of the electric welding waveform (e.g., 100), during the background current phase (e.g., 110), providing an intermediate current level (e.g., 151) being between the background current level (e.g., 111) and the peak current level (e.g., 131).

Figure 8:
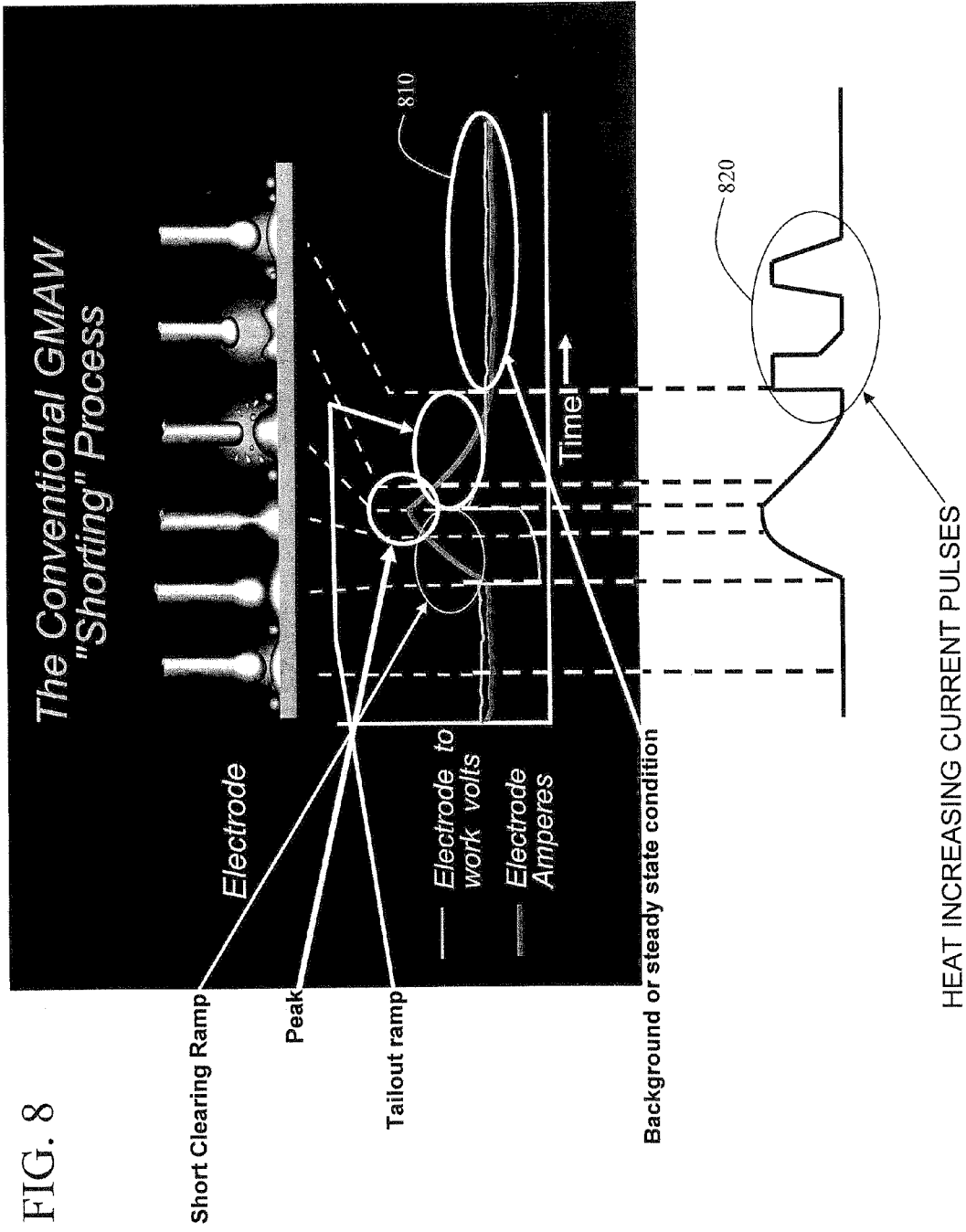
FIG. 8 illustrates an exemplary embodiment of a cycle of a conventional GMAW electric welding waveform having a background current phase to which heat increasing current pulses may be added.

In general, and in accordance with various embodiments of the present invention, any welding waveform having a background current phase may be modified to include at least one heat increasing current pulse. For example, FIG. 8 illustrates an exemplary embodiment of a cycle of a conventional GMAW electric welding waveform (e.g., a surface tension transfer (STT) waveform) having a background current phase 810 to which heat increasing current pulses 820 may be added. The heat increasing current pulses 820 may serve to increase penetration, reduce hardness, allow for increased welding travel speeds, and/or reduce preheating requirements.

The heat increasing current pulses 820 increase the heat input to the weld above what a typical STT (surface tension transfer) waveform produces, allowing greater penetration which reduces the weld bead hardness and allows for the joint to approach a closed gap configuration, if desired. The ability to close the gap means that the pipe sections may be butted tightly against each other. In a machined joint, a tight gap may be held all the way around the pipe to a very small tolerance. When a larger gap exists, the tolerance of the gap increases. By taking the gap to zero (or near zero), the precision improves. Also, it is easier for the fabricator to place and hold the pipes in contact, rather than holding a gap. Furthermore, less weld metal is used when the gap is closed. Furthermore, in closed root welding, greater heat input may be required to achieve adequate penetration. The heat increasing pulses may be used to provide the greater heat input.

Weld bead hardness is reduced when the amount of admixture increases, diluting the stronger weld metal. Admixture increases when there is more preheat or when the heat of the welding process increases. Previously, only preheating was used. However, the heat increasing pulses 820 allow for the option to increase the heat input to the weld while decreasing the amount of preheating.

Figure 9:
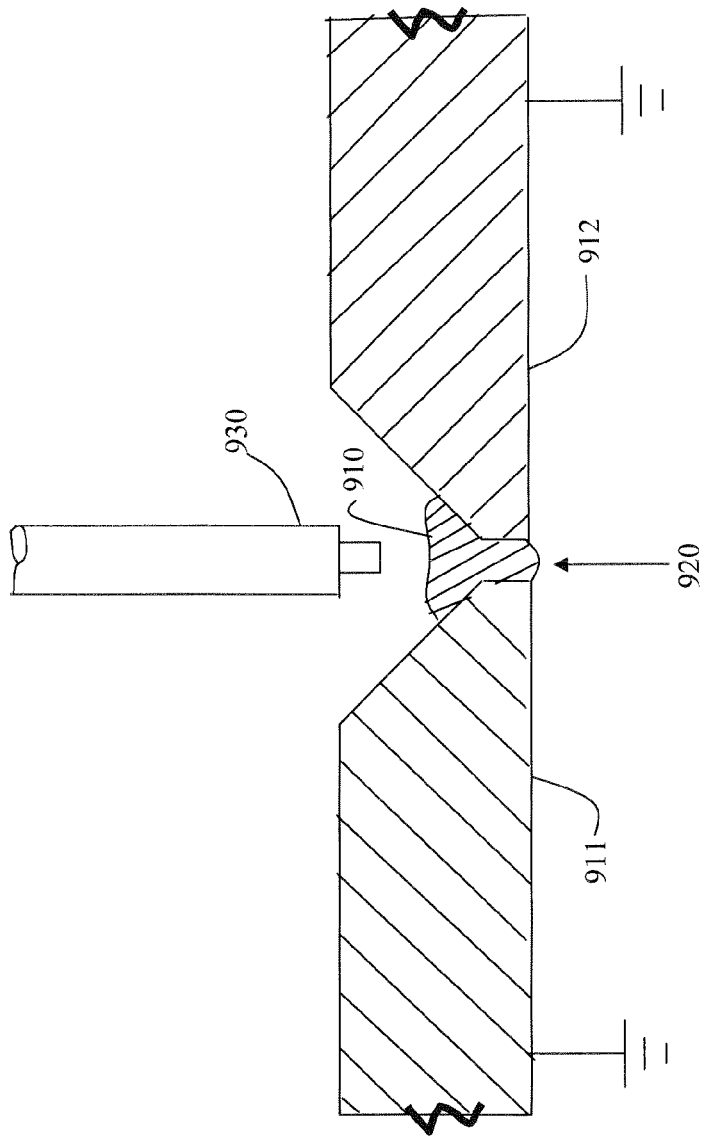
FIG. 9 illustrates the forming of a root pass weld for a root pipe joint between two sections of pipe, in accordance with an embodiment of the present invention.

For example, FIG. 9 illustrates the forming of a root pass weld 910 for a root pipe joint 920 between two sections of pipe 911 and 912, in accordance with an embodiment of the present invention. A series of electric arc pulses are generated between an advancing welding electrode 930 and the root pipe joint 920 in response to a substantially periodic electric welding waveform that is generated using a welding power source. The welding power source is operatively connected to the electrode 930 and the pipe sections 911 and 912. The root pipe joint may be an open root joint or a closed root joint, in accordance with various embodiments of the present invention. Such pipe welding operations are often performed automatically by automatic welding means using robots or automated welding rigs adapted to travel around a pipe joint.

In accordance with an embodiment of the present invention, the electric welding waveform includes a base cycle having a background current phase providing a background current level, a peak current phase providing a peak current level, and a tail-out current phase providing a decreasing tail-out current level. The electric welding waveform also includes at least one heat-increasing current pulse during the background current phase providing a heat-increasing current level being above the background current level. The electric welding waveform may further include a pinch current phase between the background current phase and the peak current phase providing an increasing pinch current level.

In accordance with an embodiment of the present invention, a resulting hardness level of the root pass weld 910 is less than or equal to 248HV10 where 248 is the hardness number, HV is the hardness scale (i.e., Vickers), and 10 indicates the load used in kilograms for testing and measuring the hardness. The 248HV10 hardness limit is a typical requirement for off-shore and deep water applications. The Vickers hardness scale and Vickers hardness test are well known in the art.

If the root pass weld 910 cools too quickly when being formed, the hardness level may be too high resulting in built-up stresses in the weld 910. The upper hardness limit of 248HV10 may be ensured by the heat-increasing pulses in the background phase of the electric welding waveform and serve to prevent cracking of the root pass weld 910 when the pipe sections 911 and 912 attempt to move with respect to each other due to external forces. The heat-increasing pulses of the applied electric welding waveform add heat to the root pass weld 910, reducing stresses therein which results in a lower hardness level for the weld. At a lower hardness level, instead of cracking, the pipe sections will tend to bend in a more forgiving manner when external forces are applied.

In accordance with an embodiment of the present invention, a resultant welding travel speed while forming the root pass weld 910 is greater than or equal to 12 inches per minute for a given amount of penetration. The welding electrode may be made of, for example, carbon steel, a nickel alloy, or a nickel-chromium-molybdenum alloy (e.g., Inconel 625). Other welding electrode compositions are possible as well. A shielding gas including, for example, argon and $CO_2$ may be used when forming the root pass weld 910.

In summary, a method and a system for forming a root pass weld for a root pipe joint are disclosed. A substantially periodic electric welding waveform is generated and a series of electric arc pulses are generated between an advancing welding electrode and a root pipe joint in response to the electric welding waveform. The electric welding waveform includes a base cycle having a background current phase providing a background current level, a peak current phase providing a peak current level, a tail-out current phase providing a decreasing tail-out current level, and at least one heat-increasing current pulse during the background current phase providing a heat-increasing current level being above the background current level. Such an increase in heat provided by the heat-increasing current pulses may be desired in, for example, the welding of an open root joint in order to provide better penetration without increasing the fluidity of the puddle, a lower hardness level of the weld, a faster travel speed, and/or a lower pre-heating requirement.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of forming a root pass weld for a root pipe joint, said method comprising:
   generating a substantially periodic electric welding waveform using a welding power source; and
   generating a series of electric arc pulses between an advancing welding electrode and a root pipe joint in response to said electric welding waveform, wherein said electric welding waveform includes:
      a base cycle having a background current phase providing a background current level, a peak current phase providing a peak current level, and a tail-out current phase providing a decreasing tail-out current level, and
      at least one heat-increasing current pulse during said background current phase providing a heat-increasing current level being above said background current level.

2. The method of claim 1 wherein said electric welding waveform further includes a pinch current phase between said background current phase and said peak current phase providing an increasing pinch current level.

3. The method of claim 1 wherein a resultant hardness of said root pass weld is less than or equal to a value of 248 HV 10.

4. The method of claim 1 wherein a resultant welding travel speed while forming said root pass weld is greater than or equal to 12 inches per minute.

5. The method of claim 1 wherein said root pipe joint is an open root joint.

6. The method of claim 1 wherein said root pipe joint is a closed root joint.

7. The method of claim 1 wherein said welding electrode comprises carbon steel.

8. The method of claim 1 wherein said welding electrode comprises a nickel alloy.

9. The method of claim 1 wherein said welding electrode comprises a nickel-chromium-molybdenum alloy (e.g., Inconel 625).

10. The method of claim 1 wherein said method is part of a gas metal arc welding (GMAW) process using argon and $CO_2$ as shielding gases.

11. A system for forming a root pass weld for a root pipe joint, said system comprising:
    means for generating a substantially periodic electric welding waveform; and
    means for generating a series of electric arc pulses between an advancing welding electrode and a root pipe joint in response to said electric welding waveform, wherein said electric welding waveform includes:
      a base cycle having a background current phase providing a background current level, a peak current phase providing a peak current level, and a tail-out current phase providing a decreasing tail-out current level, and
      at least one heat-increasing current pulse during said background current phase providing a heat-increasing current level being above said background current level.

12. The system of claim 11 wherein said electric welding waveform further includes a pinch current phase between said background current phase and said peak current phase providing an increasing pinch current level.

13. The system of claim 11 wherein a resultant hardness of said root pass weld is less than or equal to a value of 248 HV 10.

14. The system of claim 11 further comprising means for providing a resultant welding travel speed, while forming said root pass weld, said resulting welding travel speed being greater than or equal to 12 inches per minute.

15. The system of claim 11 wherein said root pipe joint is an open root joint.

16. The system of claim 11 wherein said root pipe joint is a closed root joint.

17. The system of claim 11 wherein said welding electrode comprises carbon steel.

18. The system of claim 11 wherein said welding electrode comprises a nickel alloy.

19. The system of claim 11 wherein said welding electrode comprises a nickel-chromium-molybdenum alloy (e.g., Inconel 625).

20. The system of claim 11 wherein said system is a gas metal arc welding (GMAW) system using argon and $CO_2$ as shielding gases.

* * * * *